June 16, 1936.   J. TJAARDA   2,044,232
WHEEL SUSPENSION AND STEERING MECHANISM
Filed Dec. 1, 1933   2 Sheets-Sheet 2
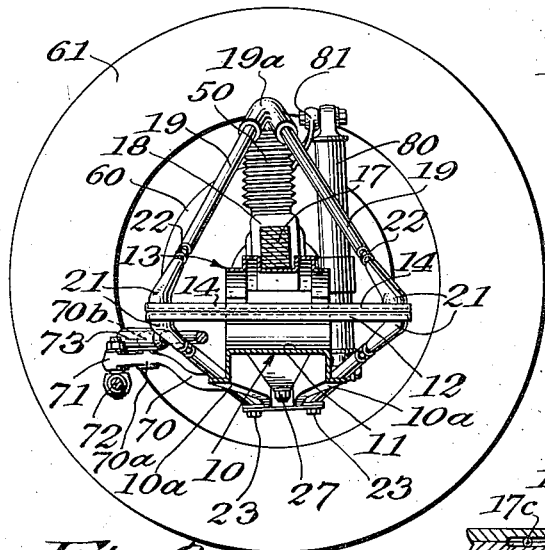
Fig. 3
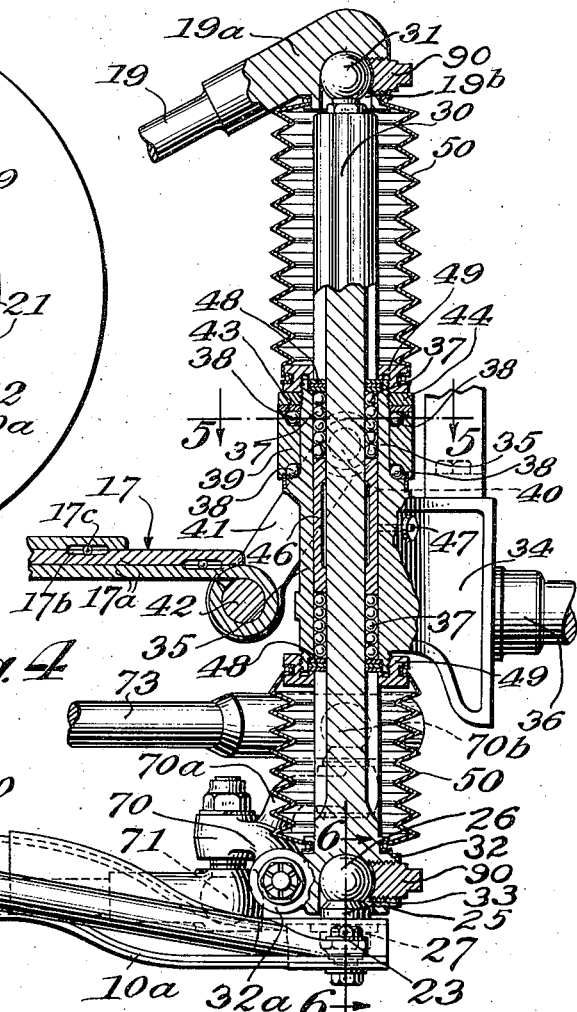
Fig. 4
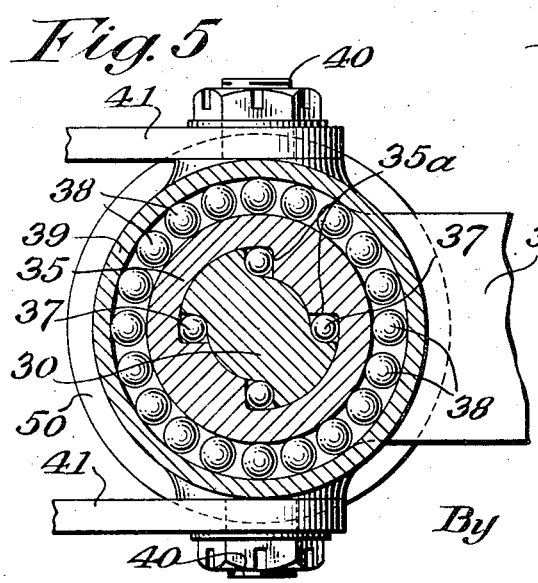
Fig. 5
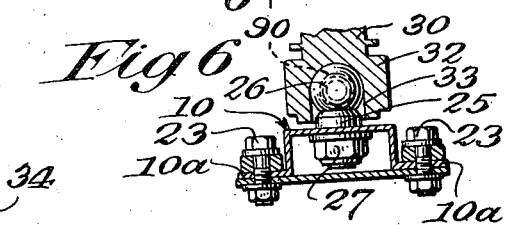
Fig. 6
Fig. 7
Inventor:
John Tjaarda
By Dike, Calvert & Gray
Attorneys.

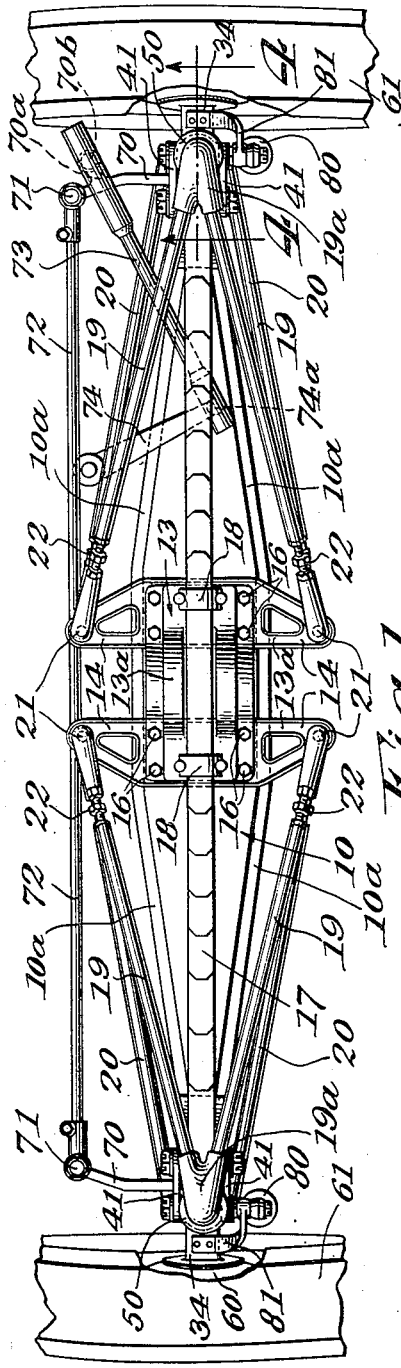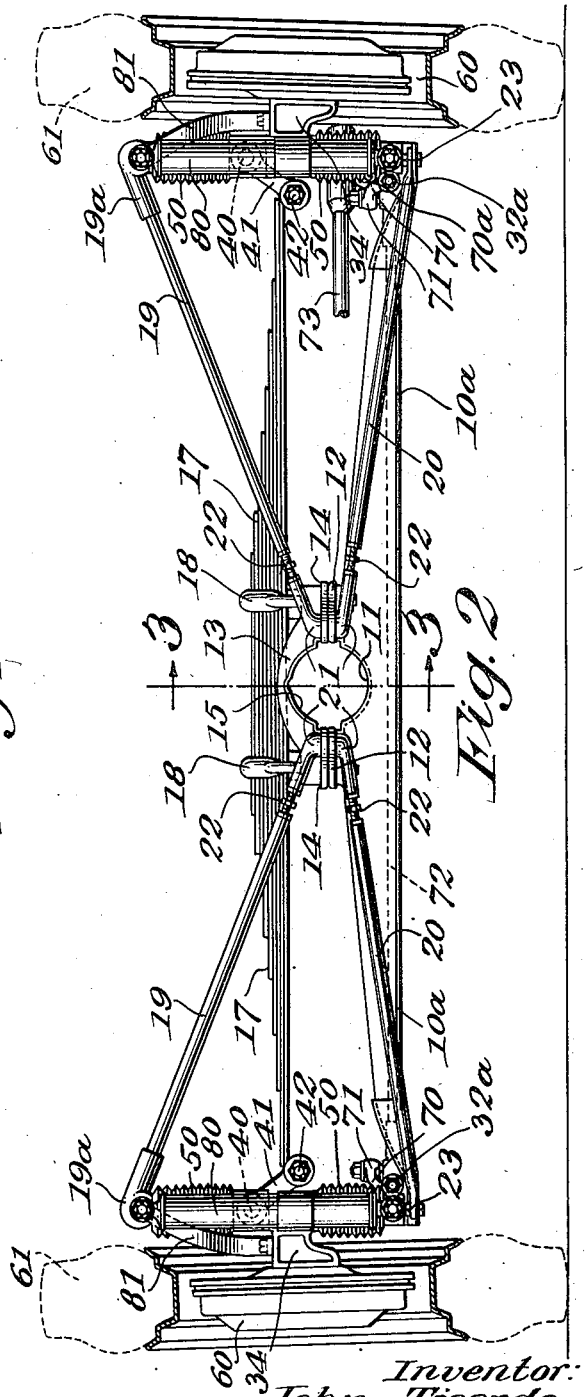

Patented June 16, 1936

2,044,232

UNITED STATES PATENT OFFICE 2,044,232

WHEEL SUSPENSION AND STEERING MECHANISM

John Tjaarda, Birmingham, Mich., assignor to Briggs Manufacturing Company, Detroit, Mich., a corporation of Michigan Application December 1, 1933, Serial No. 700,444

11 Claims. (Cl. 280—96.2)

This invention relates to vehicles, such as motor vehicles, and more particularly to the front axle construction, wheel suspension and steering mechanism for such vehicles.

Heretofore, motor vehicles have been provided with a one-piece front axle having steering spindle assemblies at the opposite ends thereof which assemblies were mounted upon fixed king pins for rotation relative to and upon said king pins. Steering of the vehicle was effected by turning the front wheels and steering spindle assemblies about the fixed king pins carried by the front axle. The modern trend in motor vehicles is to lower the center of gravity of such vehicles and this has been difficult with the present known types of front axle and frame constructions. With the increase of speed and power, it is important that modern motor vehicles have their center of gravity as low as possible. One of the disadvantages of the present types of front axle construction is that shocks to which one of the front wheels is subjected are transmitted through each wheel and its steering spindle assembly and thence through the front axle to the opposite front wheel, and since the front axle is directly connected with the vehicle frame, these shocks are transmitted to the vehicle frame.

It is one of the objects of the present invention to provide a construction permitting a low center of gravity of the vehicle and one wherein shocks to which one of the wheels and its steering spindle assembly are subjected are readily absorbed without disturbing the angularity of the vehicle body and are not transmitted to the opposite front wheel and steering spindle assembly, thus providing substantially independently sprung wheels.

Another object of the invention is to provide an improved front axle construction and front wheel mounting wherein the wheels are independently sprung with respect to the steering mechanism.

A further object of the invention is to provide means for rigidly bracing the front axle construction and to permit easy and quick adjustment of the toe-in of the front wheels.

Other objects of the invention will appear in the following description and appended claims, reference being had to the accompanying drawings forming a part of this specification wherein like reference characters designate corresponding parts in the several views.

In said drawings:

Fig. 1 is a top plan view of the front axle construction, wheel suspension and part of the steering mechanism of a vehicle embodying the invention.

Fig. 2 is a front elevation of the same.

Fig. 3 is a vertical cross section taken substantially along the line 3—3 of Fig. 2.

Fig. 4 is a detail vertical sectional view, partly in elevation, taken substantially along the line 4—4 of Fig. 1.

Fig. 5 is an enlarged horizontal section, taken substantially along the lines 5—5 of Fig. 4.

Fig. 6 is a detail vertical sectional view taken substantially along the line 6—6 of Fig. 4, looking in the direction of the arrows; and Fig. 7 is an enlarged fragmentary detail of the spring leaf construction.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawings, I have shown, by way of example, one form of construction embodying my invention in which the vehicle front axle construction comprises a transverse truss or supporting member 10 of channel formation which flares inwardly toward its center so as to be of greater depth and width at its central portion than at its outer ends. The truss member has a pair of outwardly extending flanges 10a, see Figs. 3 and 6. The central or intermediate portion of the truss member is provided with a laterally extending depression or socket 11 and has secured to the top face thereof on opposite sides of the depression reenforcing plates 12. A cap member 13 having plates 14 and a socket 15, complementary to the socket 11, is secured in place upon the plates 12 and the truss member by bolts or the like 16, see Figs. 1 and 2. A transverse multiple leaf spring 17 is seated on and secured to the cap member 13 and the central part of the spring extends between and is confined by the projections or guide bosses 13a formed therein, see Figs. 1 and 3. This spring member is held in place by means of U-bolts 18. The spring is just slightly shorter in length than the truss member and overlies the same as clearly shown in Fig. 1. The cooperating socket members 11 and 15 together provide connecting means for a torque tube or central longitudinal frame member of the vehicle chassis.

Extending from each end of the cooperating reenforcing plates 12 and 14 toward the ends of the truss member 10 is a pair of substantially V-shaped outwardly diverging brace members, each pair comprising an upper brace rod 19 and a lower brace rod or member 20. The inner ends of the brace rods are secured at 21 to the plates in any suitable manner. Each rod 19 and 20 preferably is sectioned and provided with an adjusting turnbuckle 22 for the purpose of lengthening or shortening the rods. As clearly shown in Fig. 1, there are provided four pairs of brace members 19 and 20, these members being designed to function as both tension and compression members to brace the wheel king pins. The outer ends of the lower brace members 20 are secured by bolts 23 to the truss member flanges 10a. The outer end of each of the upper brace members 19 fits into a cap member 19a having formed in the under face thereof a socket 19b for a purpose to be described hereinafter.

Refering particularly to Fig. 4, it will be seen that each of the outer ends of the truss member 10 has secured thereto a stud member 25 held in place by a nut 27. The stud member has a ball head portion 26. Thus it will be seen that the truss member has an upstanding ball-like projection at each of its ends and that the outer ends of each pair of upper brace members 19 carries a socketed head member which is disposed above and spaced from each of the ball members 26. A king pin 30 is adapted to be positioned between the opposed members 19a and 26. The king pin carries at its upper end a ball member or head 31 which fits within the socket 19b. The lower end of the king pin is provided with an enlarged portion 32 having a socket 33 formed therein, this socket being adapted to receive the ball head 26. The enlarged portion 32 has an integral offset socket portion 32a which is adapted to connect with and support one of the elements of the steering mechanism to be described hereinafter. Suitable means may be provided for interlocking the balls 26 and 31 within their respective sockets 33 and 19b to prevent disconnection of the parts. This may comprise, as illustrated in Fig. 6, an adjusting bolt or threaded plug 90 screwed into a tapped hole in each of the parts 32 and 19a, the inner end of the bolt being machined to conform to the curvature of the ball. Thus the bolt may be adjusted so that the inner end thereof will snugly embrace the ball and prevent disconnection of the ball and socket while permitting free relative rotative movement of the parts.

The king pin is thus mounted for rotation or oscillation relative to the head 26 and the socket 19b. The king pin is splined as best shown in Fig. 5 and is adapted to support thereupon the sleeve portion 35 of the steering spindle block or body portion 34 which carries the wheel spindle 36. It will be seen that the sleeve 35 is provided with keyways 35a which receive the splines on the king pin 30 and between these parts are interposed ball bearings 37. These ball bearings permit free axial or vertical movement of the sleeve 35 and other elements of the steering spindle assembly relatively to the king pin 30. The sleeve 35 is held against rotative movement relative to the king pin by virtue of the spline and keyway construction.

The sleeve portion 35 carries an additional sleeve or ring member 39 having diametrically opposed trunnions 40. These trunnions serve to pivotally support the outer ends of oscillatable spring shackle members 41 which straddle the ring 39, the inner ends of the shackles being attached to the ends of the spring member 17 by the usual shackle bolt 42. The ring 39 seats at its lower end upon a shoulder formed on the sleeve 35 and is provided at its upper and lower edges with inner annular races or grooves to receive ball bearings 38. An upper ball retaining plate 43 is provided to hold the upper set of balls 38 in the ball race and the ring 39 is held against axial displacement relative to the sleeve 35 by a locking washer or ring 44 which threadedly engages the sleeve. The ball bearings 38 permit rotative movement of the sleeve 35 relative to the ring 39, when turning the wheels, and eliminate friction. It will be understood that the ring 39 is not intended to rotate with the sleeve but that it is permitted to move up and down with the sleeve 35 relative to the king pin 30.

Interposed between the king pin 30 and the sleeve 35 is a bearing sleeve 46 above and below which the series of balls 37, previously referred to, are located. This bearing sleeve serves as a spacing element between the ball bearing 37. The king pin is lubricated through a suitable connection 47. The balls 37 are retained in place by means of packing washers 48 which washers are held in position by retaining rings 49. Each of the rings 49 has an external annular groove formed therein to receive one end of a bellows-like member or sylphon 50 formed of leather or other similar material capable of excluding dirt and moisture from contact with the king pin 30. The opposite end of the upper bellows-like member 50 is secured to the cap member 19a and the outer end of the lower member 50 is secured to the enlargement 32 of the king pin. It will be understood, of course, that the members 50 are sufficiently flexible to permit up and down as well as oscillating movement of the steering spindle assembly relative to the king pin supporting members.

It will be seen that the vertically slidable sleeves 35 for the front wheels are joined through the medium of their shackles 41 by the transverse spring 17, this spring being connected centrally thereof to the vehicle chassis through the central longitudinal torque tube mounted in the housing portions 11 and 15. Thus each sleeve 35 and hence its steering wheel 60, having the usual pneumatic tire 61, is permitted substantially an independent vertical movement, and the vertical movements of the wheels will not tend to displace angularly the vehicle body. The spring may comprise a suitable number of leaves 17a and in order to relieve the friction between the leaves the latter may be stamped to provide complementary grooves 17b within which are located anti-friction balls 17c, see Figs. 4 and 7.

The steering linkage herein illustrated in part may be of conventional type and in the present instance comprises a pair of arms 70, the outer ends of which arms are bolted to the sockets 32a. These arms in turn are connected at their outer ends by means of ball and socket joints 71 to the tie rod 72. The arm 70 at the right hand side of Fig. 1 has an offset portion 70a and carries an upstanding ball head or member 70b which fits in a socket formed adjacent one end of the drag link 73. The drag link has adjacent its opposite end a socket which receives a ball 74a carried by an arm or link 74. The free end of the arm or link 74 is adapted to be connected directly or indirectly to the steering column of the vehicle. Thus, it will be seen that by actuating the steering mechanism, the arms 70 which are directly connected with the lower ends of the king pins 30, serve to turn or oscillate these king pins and likewise turn or oscillate the steering spindle assembly and the vehicle front wheels. Furthermore, it will be seen that each of the vehicle wheels 60 is independently supported at opposite ends of the front axle construction and that each of these wheels can move up and down over uneven surfaces independently of one another without varying the position of the truss member 10. Since this member is directly attached to the frame of the vehicle, it will be seen that independent movement of the wheels is not transmitted to the vehicle frame so as to displace the body angularly. Suitable shock absorbers 80 may be provided, if desired, these being supported adjacent the king pins 30 in any suitable manner, as by means of brackets 81.

It will be seen that when it is desirable to adjust the toe-in of the wheels this can be accomplished by simply adjusting the turn-buckles 22 forming a part of the bracing structure.

As best shown in Figs. 3, 4 and 6 of the drawings, the outer ends of the truss member 10 are twisted at a slight angle to the horizontal so as to support the king pins and their associated parts normally in an upright position which is at a slight angle to the vertical. The truss member may be of one-piece construction or, if desired, short sections or horns for supporting the king pins may be attached to the ends of the truss member in any suitable manner, as by spot welding.

I claim:

1. In a vehicle having front steering wheels, a transverse truss member extending between the wheels and having a central mounting for a longitudinal chassis torque member, means mounted at each outer end of said member for turnably mounting each wheel, and steering mechanism connected to said means, the latter comprising relatively vertically movable parts permitting independent vertical movement of the wheels with respect to the steering mechanism.

2. In a vehicle, a front axle construction comprising a transverse truss member, brace members connected with said truss member intermediate its ends, certain of said brace members having their outer ends overlying the ends of said truss member, king pins rotatably mounted between the ends of said truss member and the overlying ends of said brace members, and a steering spindle assembly carried by each of said king pins and rotatable therewith.

3. In a vehicle, a front axle construction comprising a transverse truss member, brace members attached to said truss member intermediate its ends, certain of said brace members having their outer ends overlying the ends of said truss member, king pins rotatably mounted between the ends of said truss member and the overlying ends of said brace members, a steering spindle assembly carried by each of said king pins, a wheel rotatably mounted upon each spindle, and means connected to said king pins for rotating said pins to steer the vehicle wheels.

4. In a vehicle, a front axle construction comprising a transverse truss member, brace members attached to said truss member intermediate its ends, certain of said brace members having their outer ends overlying the ends of said truss member, a transverse spring member connected intermediate its ends to said truss member, king pins rotatably mounted between the ends of said truss member and the overlying ends of said brace members, a steering spindle assembly carried by each of said king pins, a wheel rotatably mounted upon each spindle, movable means for connecting the ends of said spring to said steering spindle assembly, and means connected to said king pins for rotating said pins to steer the vehicle wheels.

5. In a vehicle, a front axle construction comprising a transverse truss member, brace members connected with said truss member intermediate its ends, certain of said brace members having their outer ends overlying the ends of said truss member, king pins rotatably mounted between the ends of said truss member and the overlying ends of said brace members, a steering spindle assembly carried by each of said king pins and rotatable therewith, a wheel rotatably mounted upon each of said spindles, and means for adjusting the length of said brace members.

6. In a vehicle, a front axle construction comprising a transverse truss member, adjustable brace members connected with said truss member intermediate its ends, certain of said brace members having their outer ends overlying the ends of said truss member, king pins rotatably mounted between the ends of said truss member and the overlying ends of said brace members, a steering spindle assembly slidably carried by each of said king pins and rotatable therewith, a wheel rotatably mounted upon each of said spindles, and means connected to said king pins for rotating said pins to turn the vehicle wheels.

7. In a vehicle, a front axle assembly comprising a transverse truss member, a transverse spring member carried by said truss member, a pair of king pins rotatably supported upon opposite ends of said truss member, a steering spindle assembly keyed to each of said king pins for vertical sliding movement thereon, wheels rotatably mounted upon said spindles, means for connecting said spring member to said steering spindle assembly, brace members connecting said truss member and the upper ends of said king pins for supporting the latter in upright position, and means connected with said king pins for turning the same to turn the vehicle wheels.

8. In a vehicle, a front axle assembly comprising a transverse truss member, a plurality of brace members connected to said truss member at points centrally thereof and extending transversely of the vehicle to points overlying the ends of said truss member, a transverse spring member connected centrally to said truss member king pins turnably mounted between the ends of said truss member and the overlying portions of said brace members, a steering spindle slidingly carried by each of said king pins and turnable therewith, oscillatable means non-rotatably connecting the ends of said spring to each of said steering spindles, a wheel rotatably mounted upon each spindle, and steering means connected to said king pins for turning the same.

9. In a vehicle having wheel spindles and steering wheels mounted thereon and a transverse truss member extending between the wheels provided with a central mounting for a longitudinal chassis torque member, a king pin for each wheel, a substantially V-shaped brace member for each king pin connected at its inner end to said mounting and having its outer end connnected to the upper end of said pin, steering means for turning the king pins, means for mounting said wheel spindles on the king pins to turn therewith while permitting independent vertical movement of the wheels relatively to said steering means, and a vehicle spring connected to said means, said means including ball bearings for permitting frictionless vertical movement of said spindles relative to said king pins.

10. A front wheel mounting for a vehicle having steering wheels, comprising a transverse truss member extending between the wheels and having a mounting disposed centrally thereof for connection to a longitudinal chassis frame member, king pins supported at their lower ends by the outer ends of said truss member, an upper brace member connected to and supporting the upper end of each of said king pins, a lower brace member connnected at its inner end to said mounting and at its outer end to the truss member, steering mechanism for turning said king pins, means turnable with said king pins and vertically slidable thereon for supporting said wheels therefrom, and a transverse spring secured at its ends to said last named means.

11. A front wheel mounting for a vehicle having steering wheels, comprising a transverse truss member extending between the wheels and having a mounting disposed centrally thereof for connection to a longitudinal chassis frame member, king pins supported at their lower ends by the outer ends of said truss member, substantially V-shaped upper brace members separate from said truss member connected to and supporting the upper ends of said king pins, substantially V-shaped lower brace members connected at their inner ends to said mounting and at their outer ends to said truss member, steering mechanism for turning said king pins, means turnable with said king pins and vertically slidable thereon for supporting said wheels therefrom, and a transverse spring secured at its ends to said last named means and located centrally above said mounting.

JOHN TJAARDA.